United States Patent [19]
Johnakin, III

[11] Patent Number: 5,588,397
[45] Date of Patent: Dec. 31, 1996

[54] BIRD PERCH APPARATUS

[75] Inventor: E. Kimble Johnakin, III, Alpharetta, Ga.

[73] Assignee: Just Selling, Inc., Clermont, Ga.

[21] Appl. No.: 390,632

[22] Filed: Feb. 17, 1995

[51] Int. Cl.$^6$ ............................................. A01K 31/12
[52] U.S. Cl. ................................. 119/468; 119/537
[58] Field of Search ............................. 119/17, 24, 25, 119/26, 18, 460, 465, 466, 468, 531, 537

*Primary Examiner*—Todd E. Manahan
*Attorney, Agent, or Firm*—Louis T., P.C. Isaf

[57] ABSTRACT

Provided is an elongated perch rod with a disk attached to one end. The perch rod functions as a perch and nail trimming device and the disk functions as a beak trimming and conditioning device. The disk (beak conditioner) is of shorter length and larger diameter than the perch rod. A connection assembly, which acceptably includes a threaded rod, nut, and washer is attached to the face of the disk (beak conditioner) that is opposite from the face of the disk from which the perch rod extends. The connection assembly functions such that the entire bird perch apparatus can be easily mounted to a bird cage or similar structure. The perch rod and disk are preferably made of a solid, abrasive material, such as concrete or resin with a gritty material embedded therein, so that the abrasive properties of the material preferably stay constant.

22 Claims, 3 Drawing Sheets

BIRD PERCH APPARATUS

BACKGROUND OF THE INVENTION

The present invention relates generally to devices used by birds and more particularly to devices that condition the nails, leg muscles, feet or beaks of birds.

A bird's nails and beak are constantly growing. If not periodically trimmed and conditioned the performance of the beak and nails of a bird will be diminished which will potentially cause discomfort or harm to the bird. For wild birds, their beaks are kept trimmed by chewing, pecking, and rubbing abrasive objects such as stones and tree branches, while their nails are trimmed by the natural elements upon which they perch and walk. Birds will naturally scrape and rub their beaks and nails upon those abrasive surfaces they find in their habitat. This scraping and rubbing also functions to physically condition and stimulate the muscles of birds.

Pet bird owners have conventionally provided their birds with perches having abrasive surfaces for trimming their nails. Pet bird owners have also placed small rocks on the cage bottom or hung sandpapered blocks on the cage side for their birds to trim and condition their beaks upon. One example of a nail trimming item commonly found in pet stores is a perch in the form of an elongated wooden cylinder wrapped in sandpaper. A similar item that can also be found at pet stores is an elongated, cylindrical perch constructed of concrete and including an attachment assembly at one end for attaching the perch to a cage.

SUMMARY OF THE INVENTION

Briefly described, the preferred embodiments of the present invention provide a perch, nail trimmer, and beak conditioner for a bird, all in a single product. More particularly, the preferred embodiments of the present invention include an improved bird perch apparatus in the form of an elongated perch rod with a disk attached to one end. The perch rod functions as a perch and nail trimming device and the disk functions as a beak trimming and conditioning device. The improved bird perch apparatus is constructed and arranged such that when a bird is standing upon the perch rod the bird can readily trim its beak upon the disk. The disk (i.e., beak conditioner) is preferably of shorter length and larger diameter than the perch rod. A connection assembly, which acceptably includes a threaded rod, nut, and washer is attached to the face of the disk that is opposite from the face of the disk from which the perch rod extends. The connection assembly functions such that the entire bird perch apparatus can be easily mounted to a bird cage or similar structure.

The perch rod and disk of the preferred embodiments of the present invention are preferably made of a solid, abrasive material, such as, but not limited to, concrete or resin with a gritty material embedded therein. Thus, the abrasive properties of the exterior surfaces of the perch rod and disk preferably stay generally constant as material is worn away therefrom. Pigments are preferably employed to add color to the perch rod and disk.

It is therefore an object of the present invention to provide an improved and more convenient system for use by a bird for conditioning purposes such as, but not limited to, trimming its beak and nails.

Another object of the present invention is to combine a bird perch, nail trimmer, and beak conditioner into one unique apparatus.

Yet another object of the present invention is to promote the health of birds.

Still another object of the present invention is to increase the comfort of birds.

Still another object of this invention is to provide a higher degree of convenience for pet bird owners by decreasing the quantity of bird maintenance products needed for their birds.

Still another object of this invention is to provide an article of manufacture that is generally maintenance free.

Other objects, features and advantages of the present invention will become apparent upon reading and understanding this specification, taken in conjunction with the accompanying drawings.

DETAILED DESCRIPTION OF THE PREFERRED EMBODIMENTS

Figure 1:
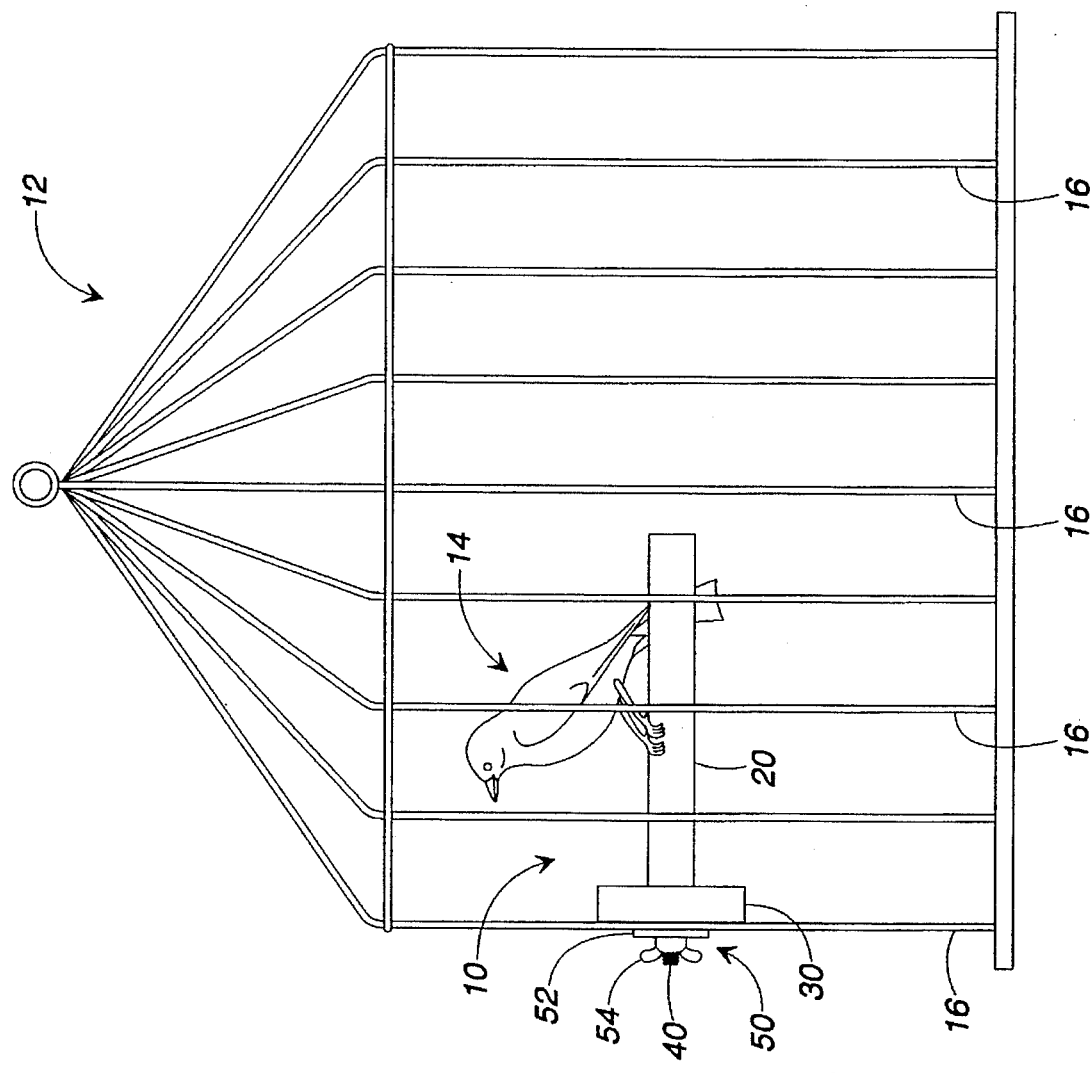
FIG. 1 is a schematic, left side view of an improved bird perch apparatus installed in a bird cage, in accordance with preferred embodiments of the present invention.

Referring now in greater detail to the drawings, in which like numerals represent like components throughout the several views, FIG. 1 is a schematic, left side view of an improved bird perch apparatus 10 mounted to a structure which is depicted, for example and not limitation, as a conventional bird cage 12. Further depicted is a bird 14 supported by the perch apparatus 10. The depicted cage 12 includes a plurality of cage bars 16, only several of which are specifically pointed out in an effort to clarify the figure. In accordance with the preferred embodiments of the present invention, the bird perch apparatus 10 includes a perch rod 20, a beak conditioner 30 connected to one end of the perch rod 20, and a connection assembly 50 for connecting the bird perch apparatus 10 to the structure (e.g., the bird cage 12). The connection assembly 50 preferably includes a threaded stabilizing rod 40 that extends from within the beak conditioner 30 and receives a washer 52 and a nut 54 such as, but not limited to, a wingnut.

Figure 2:
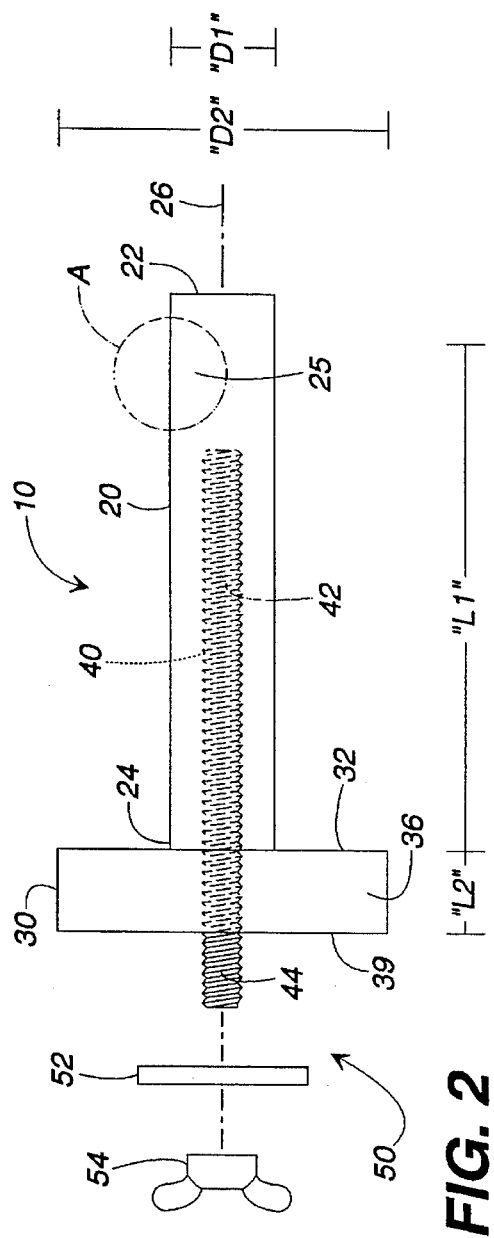
FIG. 2 is an isolated, schematic, partially exploded, left side view of the bird perch apparatus of FIG. 1.

FIG. 2 is an isolated, partially exploded, schematic, left side view of the bird perch apparatus 10, in accordance with the preferred embodiments of the present invention. In accordance with the preferred embodiments, top, bottom, and right side views of the combined beak conditioner 30, perch rod 20, and stabilizing rod 40 are identical to that which is depicted in FIG. 2. The perch rod 20 is, in accordance with the preferred embodiments, elongated and cylindrical in shape, and defines an elongated axis 26. The perch rod 20 includes a front surface 22, a back end 24, and an axially extending outer surface 25 that encircles the axis 26. A length "L1" is defined between the front surface 22 and the back end 24. A diameter "D1" is defined by the outer surface 25.

The beak conditioner 30 is, in accordance with the preferred embodiments, in the shape of an elongated disk that includes a first face which defines a front surface 32, a second face which defines a back surface 34, and an axially extending perimeter surface 36 that encircles the axis 26. A length "L2" is defined between the front surface 32 and the back surface 34. A diameter "D2" is defined by the perimeter surface 36. In accordance with the preferred embodiments of the present invention, the from surface 32 of the beak conditioner 30 is rigidly connected to the back end 24 of the perch rod 20. The beak conditioner 30 also defines the axis 26 such that the perimeter surface 36 of the beak conditioner 30 is radially displaced from the axis 26 and the outer surface 25 of the perch rod 20.

The stabilizing rod 40 is axially aligned within and embedded into the beak conditioner 30 and perch rod 20 and includes a front end 42 and a back end 44. The front end 42 is embedded in and extends through the beak conditioner 30 and into the perch rod 20, as indicated by broken lines in FIG. 2. The back end 44 of the stabilizing rod 40 is preferably threaded so as to form a bolt structure and extends axially out of and away from the back surface 34 of the beak conditioner 30. The washer 52 and nut 54 fit onto the threaded back end 44 of the stabilizing rod 40 and, in conjunction with the back surface 34 of the beak conditioner 30, function to facilitate the mounting of the bird perch apparatus 10 to a structure (e.g., bird cage 12), as discussed in greater detail below.

Figure 3:
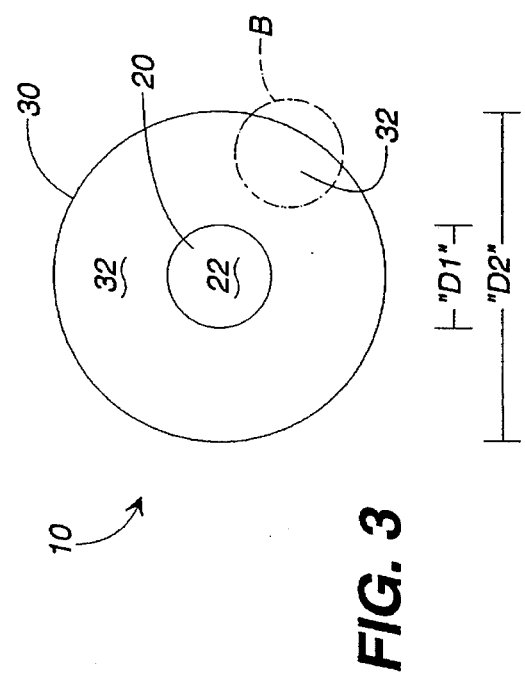
FIG. 3 is an isolated, schematic, front view of the bird perch apparatus of FIG. 1.
Figure 4:
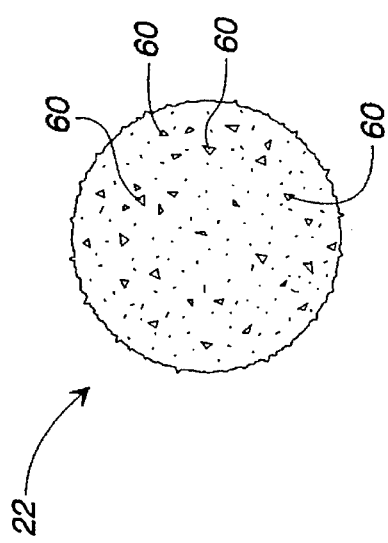
FIG. 4 is an isolated, front view of a front surface of a rod section of the bird perch apparatus of FIG. 1, which depicts a first acceptable surface characteristic.

Referring to FIGS. 2 and 3, the beak conditioner 30 is preferably of shorter length and larger diameter than the perch rod 20. In accordance with a first preferred embodiment of the present invention, in approximation, "L1"=5 inches, "L2"=0.5 inches, "D1"=0.9 inches, and "D2"=3 inches. In accordance with a second preferred embodiment of the present invention, in approximation, "L1"=7 inches, "L2"=1.5 inches, "D1"=1 inch, and "D2"=3 inches. In accordance with a third preferred embodiment of the present invention, in approximation, "L1"=9 inches, "L2"=1.5 inches, "D1"=1.25 inches, and "D2"=4 inches. In accordance with a fourth preferred embodiment of the present invention, in approximation, "L1"=11 inches, "L2"=1.5 inches, "D1"=1.5 inches, and "D2"=4 inches. In accordance with a fifth preferred embodiment of the present invention, in approximation, "L1"=15 inches, "L2"=2 inches, "D1"=2 inches, and "D2"=5.5 inches. Note that all of the foregoing dimensions are acceptable examples only and are not intended to limit the scope of the present invention. Referring to FIG. 2, in accordance with the preferred embodiments of the present invention, the perch rod 20 and the beak conditioner 30 are cast simultaneously in one mold so that the connection between the back end 24 of the perch rod 20 and the front surface 32 of the beak conditioner 30 is continuous and solid. The uncured material which is cast into the mold is preferably of a type that, once cured, will provide an abrasive exterior surface. The uncured material preferably cures to form a solid structure that is embedded with abrasive materials such that as portions of the solid structure are worn away, the surface that is exposed is abrasive. Gritty material is preferably mixed into the uncured material such that when the uncured material cures to form the perch rod 20 and beak conditioner 30, grits are embedded throughout the perch rod 20 and the beak conditioner 30. FIG. 4 is an isolated, front view of the front surface 22 of the perch rod 20 showing grit particles 60 embedded in and protruding from that surface 22, wherein FIG. 4 depicts a first acceptable (i.e. gritty) surface characteristic. FIGS. 1–3 and 7 are "schematic" in nature in that surface texture is not depicted. In accordance with the preferred embodiments of the present invention, grit particles 60 are embedded in and protrude from surfaces 22, 25, 32, 36 of the bird perch apparatus 10. One acceptable example of the uncured material from which the perch rod 20 and beak conditioner 30 are formed is a mixture of common concrete (approximately 91% by volume), a gritty material such as, but not limited to, coarse sandblasting sand (approximately 8% by volume), and pigment (approximately 1% by volume), if color is desired, which provides for uniform material properties throughout the beak conditioner 30 and perch rod 20. Another acceptable example of the uncured material is a mixture of uncured resin (approximately 60% by volume), a gritty material such as, but not limited to, sand (approximately 39% by volume), and pigment (approximately 1% by volume), if color is desired.

The stabilizing rod 40 is acceptably made of metal and the back end 44 is preferably threaded to receive the nut 54. As shown by broken lines in FIG. 2, the stabilizing rod 40 is embedded within the bird perch apparatus 10 before the mixture of uncured material has cured within the mold so that the stabilizing rod 40 is rigidly embedded within the bird perch apparatus 10 when the mixture of uncured material has fully cured.

In accordance with an alternate embodiment of the present invention, the perch rod 20 and the beak conditioner 30 are cast in separate molds. The stabilizing rod 40 is embedded solely within the perch rod 20. In this alternate embodiment, a cylindrical cavity (not shown) is formed axially through the beak conditioner 30 and is accessible at the front surface 32 and the back surface 34 of the beak conditioner 30. The back end 44 of the stabilizing rod 40 is inserted through the beak conditioner 30 by way of the above defined cavity. The front surface 32 of the beak conditioner is held flush against the back end 24 of the perch rod 20 by the connection assembly 50.

Figure 5:
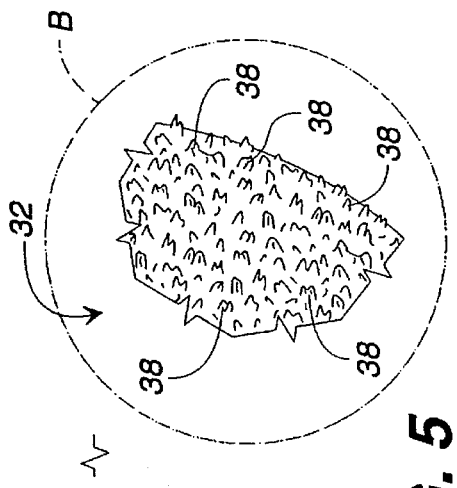
FIG. 5 is an isolated, partial, left, front, perspective view of a disk section of the bird perch apparatus of FIG. 1, which depicts a second acceptable surface characteristic.

FIG. 5 is an isolated, schematic, partial, left, front, perspective view of a portion of the front surface 32 of the beak conditioner 30 that is encircled by broken line "B" of FIG. 3, wherein FIG. 5 depicts a second acceptable surface characteristic. In the most preferred embodiment of the present invention, the surfaces 22, 25, 32, 36 of the bird perch apparatus 10 define a multiplicity of hard, protruding nodules 38 that are preferably formed by impressions included in the surface of the mold from which the beak conditioner 30 and perch rod 20 are formed. In that most preferred embodiment, the surfaces 22, 25, 32, 36 include both the nodules 38 and the grit particles 60 (i.e., a combination of that which is depicted in FIGS. 4 and 5, and defined by surfaces 22 and 32).

Figure 6:
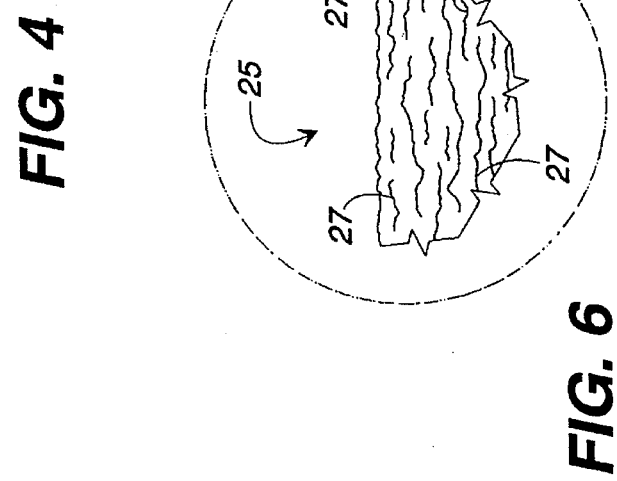
FIG. 6 is an isolated, partial view of the rod section of the bird perch apparatus of FIG. 1, which depicts a third acceptable surface characteristic.

FIG. 6 is an isolated, schematic, partial, left side view of a portion of the outer surface 25 of the perch rod 20 that is encircled by the broken line "A" of FIG. 2, wherein FIG. 6 depicts a third acceptable surface characteristic. In accordance with an alternate embodiment of the present invention, the surfaces 22, 25, 32, 36 preferably define a plurality of elongated ridges 27 (the peaks of which are represented by jagged lines in FIG. 6) that protrude away from the surfaces 22, 25, 32, 36, respectively. The ridges 27 are acceptably formed by the above mentioned mold or by scraping the surfaces 22, 25, 32, 36 with a wire brush before the material from which the perch rod 20 and beak conditioner 30 are formed has fully cured. In the alternate embodiment that includes ridges 27, the surfaces 22, 25, 32, 36 preferably include both ridges 27 and grit particles 60 (i.e., a combination of that which is depicted in FIGS. 4 and 6, and defined by surfaces 22 and 25). In certain embodiments, nodules 38 (FIG. 5) and ridges 27 (FIG. 6) are not defined by the surfaces 22, 25, 32, 36 of the bird perch apparatus 10. However, in those embodiments all of the surfaces 22, 25, 32, 36 are abrasive due to the fact that they are embedded with grit particles 60 (FIG. 4), as discussed above.

Figure 7:
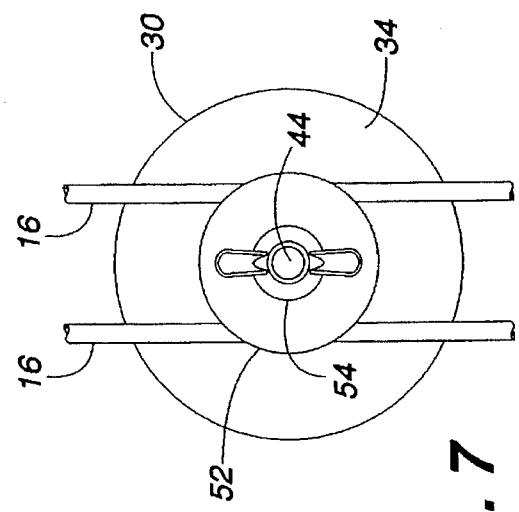
FIG. 7 is a schematic, cut-away, rear view of the bird perch apparatus of FIG. 1 installed in a bird cage, in accordance with preferred embodiments of the present invention.

Referring now to FIG. 7, in the preferred embodiments of the present invention, the bird perch apparatus 10 is acceptably mounted to a structure (e.g., the bird cage 12) by bracketing structural elements (e.g., the cage bars 16) between the back surface 34 of the beak conditioner 30 and the washer 52 and nut 54. In such a configuration, the perch rod 20 functions as a perch for the bird 14. The outer surface 25, with the abrasive characteristics described above, of the perch rod 20 facilitate the grabbing and holding of the perch rod 20 by the bird's 14 feet. The outer surface 25 further functions to trim the nails of the bird 14 when walked upon by the bird 14 and scraped by the bird's 14 feet. The beak conditioner 30 functions as a beak trimmer and conditioner due to the fact that it is strategically placed and the surfaces 32, 36 include the abrasive characteristics described above.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A bird perch apparatus for connection to a structure, the apparatus comprising:

an elongated first member, wherein said first member includes a first end, a second end, and an exterior first surface extending between said first end and said second end and including a first plurality of grits, and wherein the elongated axis of said first member extends in a direction defined generally between said first end and said second end, and a second member connected to said first member proximate to said second end and extending generally perpendicularly and substantially away from said first surface of said first member and said elongated axis for generally 360 degrees about said elongated axis, wherein said second member includes an exterior second surface including a second plurality of grits.

2. The bird perch apparatus of claim 1, wherein said first surface defines a plurality of first surface characteristics selected from surface characteristics of elongated ridges and protruding nodules, wherein said second surface defines a plurality of second surface characteristics selected from surface characteristics of elongated ridges and protruding nodules, and wherein said first member and said second member are constructed of a solid material that is embedded throughout with a multiplicity of grits, and said solid material that is embedded throughout with said multiplicity of grits defines said plurality of first surface characteristics and said plurality of second surface characteristics.

3. The bird perch apparatus of claim 2, wherein said first surface includes a plurality of protruding nodules, and wherein said second surface includes a plurality of protruding nodules.

4. The bird perch apparatus of claim 1, wherein said first surface defines an outer first radius from the elongated axis, wherein said second surface defines an outer second radius from said elongated axis, and wherein said second radius is more than twice said first radius.

5. The bird perch apparatus of claim 4, wherein said second member includes a first end and an opposite second end, wherein said first end of said second member is connected to said second end of said first member, and wherein the apparatus further comprises a connection means extending from within said first member for reinforcing said first member and further for connecting said second end of said second member to the structure, wherein said connection means is constructed and arranged so that said bird perch apparatus can be secured to the structure such that a point on said second surface that is bisected by a radius extending perpendicularly from said elongated axis can be arranged at any angle about said elongated axis.

6. The bird perch apparatus of claim 4, wherein said second member includes a first end and a second end, wherein said first end of said second member is connected to said second end of said first member, and wherein the apparatus further comprises a connection means including an elongated rod extending into said first member and defining a threaded portion protruding from said second end of said second member, and a nut for cooperating with said threaded portion of said rod.

7. The bird perch apparatus of claim 4, wherein said second radius is at least two and a half times greater than said first radius.

8. The bird perch apparatus of claim 7, wherein said first member defines a first axial length, wherein said second member defines a second axial length, and wherein said first axial length is at least two times greater than said second axial length.

9. The bird perch apparatus of claim 1, wherein said second member is generally in the shape of a thick disk having a disk axis that is generally parallel to said elongated axis of said first member, said disk including a front surface connected to said second end of said first member, wherein a substantial portion of said front surface extends generally perpendicularly and substantially away from said first surface of said first member and said elongated axis of said first member for generally 360 degrees about said elongated axis, a back surface opposite from said front surface, and a perimeter surface extending between said front surface and said back surface and generally extending around said elongated axis.

10. The apparatus of claim 9, further comprising an elongated rod extending into and reinforcing said first member and defining a threaded portion protruding from said back surface of said second member, and a nut for cooperating with said threaded portion of said rod.

11. The bird perch apparatus of claim 9, wherein said disk axis and said elongated axis of said first member are generally collinear.

12. The apparatus of claim 9, wherein said first member is generally cylindrical, whereby said elongated axis of said first member is a cylinder axis.

13. In combination:

a bird cage including an upright structure; and a bird perch apparatus connected to said structure and including an elongated first member extending generally horizontally, wherein said first member includes
a first end,
a second end, and
an exterior first surface including a first plurality of grits, and wherein the elongated axis of said first member extends generally horizontally in a direction generally defined between said first end and said second end, a second member connected to said first member proximate to said second end and extending generally vertically upward and substantially away from said exterior first surface of said first member and the elongated axis, wherein said second member includes an exterior second surface including a second plurality of grits, and a connection means connecting said second member to said upright structure.

14. The combination bird cage and bird perch apparatus of claim 13, wherein said first surface defines a plurality of first surface characteristics selected from surface characteristics of elongated ridges and protruding nodules, wherein said second surface defines a plurality of surface characteristics selected from surface characteristics of elongated ridges and protruding nodules, and wherein said first member and said second member are constructed of a solid material that is embedded throughout with a multiplicity of grits, and said solid material that is embedded throughout with said multiplicity of grits defines said plurality of first surface characteristics and said plurality of second surface characteristics.

15. The combination bird cage and bird perch apparatus of claim 13, wherein said connection means includes a rod partially embedded in and reinforcing said first member and defining a threaded portion protruding from said second member, and a nut threadedly engaged to said threaded portion, wherein said upright structure of said cage is sandwiched between said nut and said second member.

16. The combination bird cage and bird perch apparatus of claim 13, wherein said first surface is a first generally cylindrical surface that extends around said elongated axis at a first outer radius from said elongated axis, wherein said second surface is a second generally cylindrical surface that extends around said elongated axis at a second outer radius from the elongated axis, wherein said second radius is more than twice said first radius, and wherein said second member further includes a connecting surface interposed and connected between said first cylindrical surface and said second cylindrical surface, said connecting surface extending generally around and generally perpendicular to said elongated axis.

17. The combination bird cage and bird perch apparatus of claim 13, wherein said second member extends generally perpendicularly and substantially radially outward from said first member through 360 degrees about said elongated axis.

18. The combination bird cage and bird perch apparatus of claim 17, wherein said first member defines a first axial length, wherein said second member defines a second axial length, and wherein said first axial length is at least two times greater than said second axial length.

19. The combination bird cage and bird perch apparatus of claim 13, wherein said second end of said first member is supported solely in a cantilever fashion.

20. A bird perch apparatus for connection to a structure, the apparatus comprising:

a generally cylindrical elongated first member including
a first end,
a second end, and
an exterior first surface extending between said first end and said second end generally surrounding the cylinder axis of said first member, said cylinder axis extending in a direction defined between said first end and said second end;

a thick disk defining a disk axis that is generally parallel to said cylinder axis of said first member, wherein said disk includes
a front surface connected to said second end of said first member, wherein a substantial portion of said front surface extends generally perpendicularly and substantially away from said first surface of said first member and said cylinder axis for generally 360 degrees about said cylinder axis,
a back opposite from said front surface, and
a perimeter surface extending between said front surface and said back surface and generally extending around said cylinder axis, wherein said first member defines a plurality of first surface characteristics selected from surface characteristics of elongated ridges and protruding nodules, wherein said disk defines a plurality of second surface characteristics selected from surface characteristics of elongated ridges and protruding nodules, and wherein said first member and said disk are constructed of a solid material that is embedded throughout with a multiplicity of grits, and said solid material that is embedded throughout with said multiplicity of grits defines said first surface characteristics and said second surface characteristics;

an elongated rod extending into and reinforcing said first member; and a connection means associated with said back surface of said disk for connecting said bird perch to the structure.

21. The apparatus of claim 20, wherein said disk axis and said cylinder axis are generally collinear.

22. The apparatus of claim 20, wherein said connection means includes a threaded portion of said rod which protrudes from said second surface of said disk, and a nut for threadedly cooperating with said threaded portion.

* * * * *

UNITED STATES PATENT AND TRADEMARK OFFICE
CERTIFICATE OF CORRECTION

PATENT NO. : 5,588,397
DATED : December 31, 1996
INVENTOR(S) : E. Kimble Johnakin III It is certified that error appears in the above-identified patent and that said Letters Patent is hereby corrected as shown below:

Title page, item
[75] Inventor:
    Alpharetta, GA. should be changed to read -- Lula, Ga. --

Signed and Sealed this

Sixth Day of May, 1997

Attest:

BRUCE LEHMAN

Attesting Officer    Commissioner of Patents and Trademarks